July 29, 1924.
C. MURNANE
FARM TRACTOR
Filed June 19, 1922
1,503,278
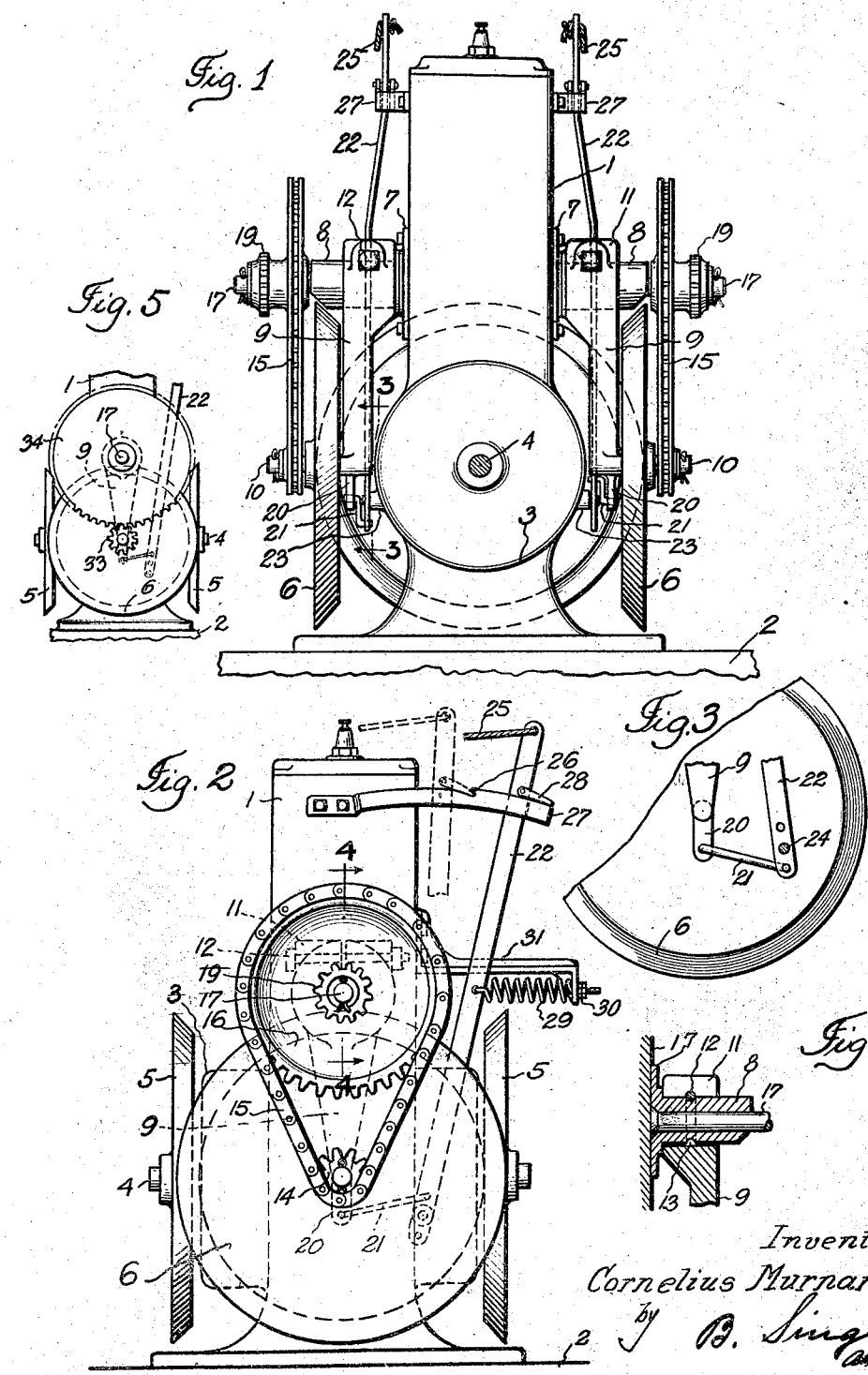
Inventor
Cornelius Murnane Patented July 29, 1924.

1,503,278

UNITED STATES PATENT OFFICE.

CORNELIUS MURNANE, OF BALACLAVA, VICTORIA, AUSTRALIA, ASSIGNOR TO MURNANE TRACTOR LTD., OF MELBOURNE, AUSTRALIA, A CORPORATION OF AUSTRALIA.

FARM TRACTOR.

Application filed June 19, 1922. Serial No. 569,221.

*To all whom it may concern:*

Be it known that I, CORNELIUS MURNANE, a subject of the King of Great Britain, 145ª Chapel Street, Balaclava, Victoria, Australia, have invented certain new and useful Improvements in Farm Tractors, of which the following is a specification.

This invention relates to improvements in farm tractors, and especially in tractors of small capacity.

It is an object of the invention to provide in combination with a prime mover as, for instance, an internal combustion engine, a simple combined transmission and steering gear for driving the tractor as desired in any predetermined direction or for disconnecting the prime mover from the driving gear to cause the tractor to remain at rest.

It is also an object of the invention to effect the drive of the tractor from the prime mover by means of friction elements, and to arrange the driving elements in duplicate in order to facilitate the change from forward drive to reverse drive, as well as the steering of the tractor.

It is furthermore an object of the invention to utilize a set of flywheels in connection with the prime mover for driving a set of friction wheels and to support said driving and driven wheels on the device in such manner that the supports of one set of said wheels may be moved relatively to the other, causing thereby a reversion of the drive upon alteration of the relation of these gears to each other.

It is furthermore an object of the invention to control the position of the elements having the movable support by means of levers which are readily accessible to the operator, or which can be moved by an operator seated remotely from the prime mover.

With these and numerous other objects in view, embodiments of the invention are illustrated in the accompanying drawings, to which reference is made in the following specification.

In the drawings:

Fig. 1 is partly elevation and partly section of a prime mover with the improved drive mechanism for the tractor;

Fig. 2 is a side elevation of the same;

Fig. 3 is a detail section on line 3—3 of Fig. 1;

Fig. 4 is a detail section on line 4—4 of Fig. 2, and

Fig. 5 shows on a smaller scale parts of a slightly modified embodiment of the invention in elevation.

The prime mover is illustrated here as a one-cylinder combustion engine 1, although it is obvious that an engine having a plurality of cylinders or an entirely different prime mover may be used. This prime mover is mounted in some suitable way, not illustrated, on a frame portion 2 of the tractor and comprises a crank casing 3 in which the crank shaft 4 is supported in some suitable way. The shaft projects at both ends from the crank casing and carries at the projecting ends flywheels 5, the rims of which are beveled and finished to constitute the driving elements of a friction drive.

Mounted for cooperation with either of the flywheels 5 or for remaining in neutral central position is a pair of friction wheels 6, which are movable independently of each other and the rims of which are beveled to cooperate with the beveled rims of the flywheels 5. Their rims are provided with a suitable coating or layer to enhance the friction and to assure a proper driving engagement with the rims of the flywheels. The supports of these friction members 6 are movable relatively to the engine casing and to the supports of the flywheels 5. In the embodiments illustrated flanges 7, each having a bearing stud 8, are bolted or in some other way secured to the casing 1, one at each side thereof, and the studs 8 serve as fulcrums for arms 9, the lower ends of which project at right angle therefrom and form journal pins 10 for the friction wheels 6.

From Figs. 2 and 4 it will be noted that each arm 9 has at the top a split head 11, provided with a suitable bore by means of which it is rotatably fitted to the stud 8. The two portions of the split head 11 are drawn towards each other to remain in proper rotary engagement with the studs 8 by means of a bolt 12, which also is utilized to prevent axial displacement of the arm on the stud. For this purpose a circumferential groove 13 (Fig. 4) is cut into each stud 8, the bolt 12 passing through a portion of said groove to be secured against lateral displacement. This construction is provided at each side of the combustion engine, as clearly apparent from Fig. 1.

The friction wheels 6 rotate loosely on the pertaining journal pins 10 and are rigidly united with sprockets 14 over which chains 15 are trained, said chains serving for driving larger sprockets 16 which are loosely mounted on fixed shafts 17 supported within the studs 8. The sprockets are furthermore preferably made integral with smaller sprockets 19 from which the final drive for the tractor wheels (not shown) at both sides of the tractor may be transmitted. This continuation of the driving train is however not illustrated in the drawing and does not form the subject matter of the present invention.

It is obvious that upon a swinging movement being imparted to the arms 9 in one or the other direction, the friction elements 6 pertaining thereto will be thrown into operative engagement, each with one or the other of the flywheels 5 which are permanently driven by the engine, and depending upon the engagement with either one or the other of these flywheels, the friction wheels 6 will be driven in one or the other direction, communicating this drive through the sprocket chain 15 to the sprocket 16 and to the tractor driving sprockets 19. It is also obvious that in a central position of the arm 9, the friction wheels 6 may be held in a position in which they are in engagement with neither of these flywheels, holding the tractor thereby at rest.

The control of the movable supports of the friction elements 6 is effected in the present embodiments by a pair of levers which may either extend to a point within reach of the operator, or which may be controlled by the operator through flexible elements extending near the operator's seat (not shown). The foot ends of the arms 9 are therefore provided with downwardly projecting extensions 20 which are loosely connected by means of links 21 with the levers 22. These levers are fulcrumed near their lower end on pivot pins secured to projections 23 of the crank casing. If, therefore, the levers are swung about their fulcrum pins 24 they will, through the links 21, produce a rocking movement of the arms 9 about the studs 8, the axes of said studs coinciding with the axes of the sprockets 16, so that independent of the swinging movement of these arms, an alteration in the length of the transmission train for the tractor drive does not occur.

By reference to Fig. 1 it will also be noted that the links 21, which establish connection between the arms 9 and the control levers 22, extend from the projections 20 to portions of the levers which portions at the two sides of the engine are located at different sides from the fulcrum of the lever. Owing to this arrangement the friction wheels 6 at both sides of the engine will be brought into engagement with different flywheels upon a swinging movement of the control levers 22 in the same direction, producing a drive of the sprockets 19 at both sides of the engine in the same direction and equalizing the thrusts on the crank shaft.

Means are also provided for normally retaining the control levers 22 in central position, and additional means for effecting automatically a forward drive of the tractor upon release of said control levers from their neutral position. The control levers are illustrated as being equipped at their upper ends with reins 25 which extend to the operator's seat (not shown). For the purpose of normally locking these levers in central position and thereby securing the friction wheels in inoperative or neutral position, each of said levers is provided with a pawl 28, which rides over the edge of an arcuate bracket 27 secured to the sides of the casing 1. This bracket is provided with a notch 26 into which the nose of the pawl 28 automatically drops when the lever 22 is moved over said notch at a speed which is not too high to cause said pawl to slide over the notch without dropping into the same. When the pawl is located within the notch 26 the lever is held in this locked position owing to the provision of a spring 29 which is anchored at one end to a point on the lever and whose other end is adjustably secured at 30 to a bracket 31, also shown fastened to the casing 1. Upon release of the holding pawl 28 from the notch 26, the control lever 22 therefore will be moved in a predetermined direction, causing the friction gears 6 to enter with the flywheels 5 into an engagement which will produce the forward drive of the tractor.

In the embodiment illustrated in Fig. 5 the chain drive 15 is replaced by a direct spur gear drive comprising the pinions 33 and a larger spur gear 34 which last named gear is also mounted co-axially with the center of the stud 8 about which the arm 9 is caused to swing. In this modification, therefore, the driving relation between the pinions 33 and the spur gear 34 is not altered through adjustment of the drive for forward movement, reverse movement or rest position, and the spur gear 34 may be used directly as a tractor drive element.

The operation of the device will be understood from the above. Normally the driven wheels 6 are maintained in neutral or inoperative position through the engagement of the locking pawl 28 in the notch 26 of the bracket 27. If it is desired to drive the tractor forward the operator swings the control elements 22 to release the pawl from the locking notch, whereupon the spring 29 will pull the control element 22 in a rapid movement in a predetermined direction, eliminating the danger of the pawl 28 returning into the notch. The force of the spring being uniform, the driving engagement of the friction wheels with the flywheels will then be uniformly maintained. If it is, however, intended to retard the forward drive, the operator may move the control elements 22 against the force of the springs 29, thereby lessening the pressure of the driven elements 6 against the driving elements 5 and causing a slippage of one or both of these friction wheels with respect to the flywheels.

If it is desired to reverse the movement of the tractor the operator will move the control elements 22 backward to bring the pawl 28 beyond the notch 26 and causing the friction elements 6 to be brought each into engagement with the oppositely located flywheel.

If the operator desires to steer the tractor he may move one of the control elements 22 in a predetermined direction, leaving the other control element undisturbed, or he may move, if he desires to steer on a very short radius, one control element in one direction and the other one in opposite direction, driving thereby the tractor drive elements 19 or 34 on opposite sides of the prime mover in opposite direction. This steering movement is facilitated through the independent mounting of the two drives at both sides of the combustion engine.

I claim:

1. In a device of the character described the combinaion of a prime mover, a pair of flywheels at opposite ends of the prime mover, a pair of friction wheels at opposite sides of the prime mover, supports for said friction wheels oscillatably carried with respect to the prime mover, and means for bringing said friction wheels independently and collectively into engagement with either one of said fly-wheels.

2. In a device of the character described the combination of a prime mover, a pair of wheels driven thereby, friction wheels between said first named wheels, supporting arms for said friction wheels rotatably carried on the prime mover, and means engaging said supporting arms for bringing said friction wheels independently and collectively into engagement with said first named wheels.

3. In a device of the character described the combination of a prime mover, fly-wheels at opposite ends of the same, friction wheels at the sides of the prime mover and between said fly-wheels, studs projecting from said prime mover, supporting arms for said friction wheels rotatably suspended from said studs, drive pinions on said studs, reduction gearing between said friction wheels and said pinions, and means engaging said arms for swinging them about the studs for bringing the friction wheels into engagement with said fly-wheels without disturbing the reduction gearing.

4. In a device of the character described the combination of a prime mover, wheels driven by the same, friction wheels in engagement with said first named wheels, studs projecting from said prime mover, supporting arms for said friction wheels rotatably suspended from said studs, means for preventing axial displacement of said friction wheels, means engaging said supporting arms for bringing said friction wheels into engagement with said first named wheels, drive pinions operatively connected with said friction wheels and means for altering the speed of said drive pinions relatively to said friction wheels.

5. In a device of the character described the combination of a prime mover, wheels driven thereby, friction wheels, supports for said friction wheels movably carried by the prime mover, levers individually associated with said supports and means interposed between said supports and levers for moving said supports in opposite directions upon movement of said levers in the same direction.

6. In a device of the character described the combination with a prime mover, flywheels at opposite ends thereof, friction wheels between said fly-wheels, arms swingingly supported at one end from the prime mover and carrying the friction wheels respectively at their other ends, gear wheels in coaxial alignment with the pivots respectively of said arms, pinions coaxial and fixedly connected to said friction wheels and in driving relation with said gear wheels, and means for rotatably adjusting said arms, friction wheels and pinions about the axis of said gear wheels.

In witness whereof I affix my signature.

CORNELIUS MURNANE.